J. T. GUTHRIE.
FLY-TRAP.
No. 192,578. Patented July 3, 1877.
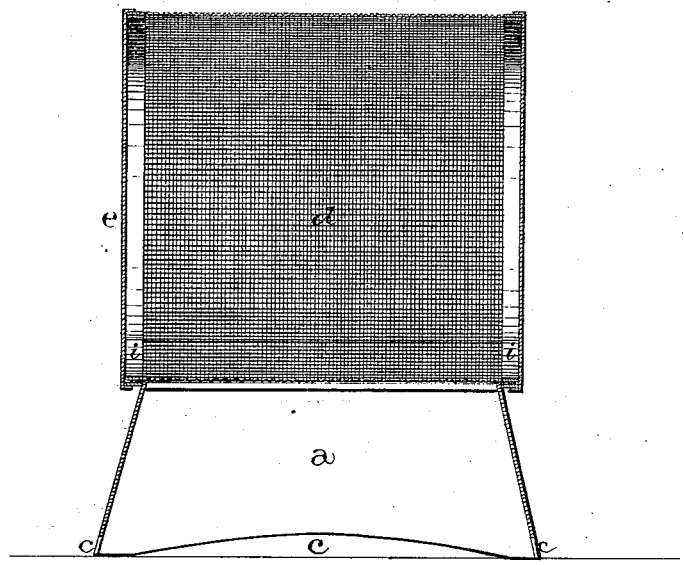
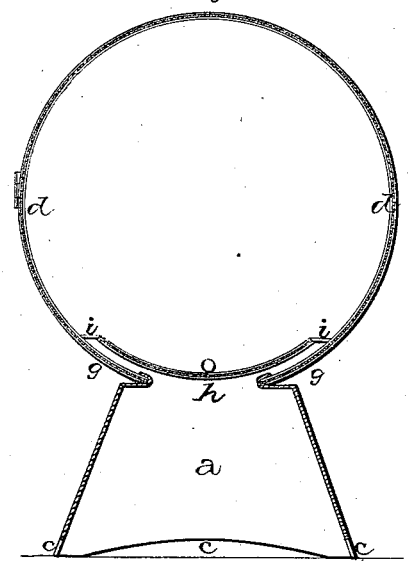
WITNESSES:
INVENTOR:
Jas. T. Guthrie
per
F. A. Lehmann,
Atty.

UNITED STATES PATENT OFFICE.

JAMES T. GUTHRIE, OF LEESBURG, OHIO.

IMPROVEMENT IN FLY-TRAPS.

Specification forming part of Letters Patent No. 192,578, dated July 3, 1877; application filed April 13, 1877.

*To all whom it may concern:*

Be it known that I, JAMES T. GUTHRIE, of Leesburg, in the county of Highland and State of Ohio, have invented certain new and useful Improvements in Fly-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in fly-traps; and it consists in the arrangement and combination of parts that will be more fully described hereinafter, whereby a cheap, simple, and effective trap is produced.

The accompanying drawings represent my invention.

$a$ represents the bottom or base of trap, made from a single piece of tin, and which has an arched entrance, $c$, cut in each side, to admit the flies to the bait placed inside. Upon the top of this base is placed the wire cylinder $d$, which is provided with the removable or hinged door $e$ at one end, for the removal of the flies that have been caught.

Between the lower edges of the cylinder there is left a space almost as wide as the top of the base, so as to admit so much light that the flies will always attempt to escape upward from the base instead of going out again at the entrances $c$. Inside of the cylinder, at each end, there is secured to the end rings $g$ curved strips of sheet-metal, $i$, which are so shaped at the ends that they are raised slightly above the rings from one end to the other. Secured to these strips $i$ is a sheet of wire-gauze, $o$, which extends entirely over the top of the opening $h$, and along up the sides of the cylinder a suitable distance, there being just sufficient space between the upper edges of the gauze $o$ and the sides of the cylinder to allow the flies to crawl between as they fly up from the base.

After the flies once get into the cylinder they make no attempt to escape the way they got in, but when they come to these openings walk or fly right over them.

Instead of gauze, any transparent material may be used for the sheet $o$, and the cylinder may be either round or diamond-shaped, as preferred.

By thus having the gauze $o$ made concave on its top, and placed in the bottom of the cylinder so as to extend up around its sides, the interior of the cylinder is not only left free and unobstructed, so that it can be more readily cleaned out, but the construction of the trap is simplified and the cost of production reduced.

Having thus described my invention, I claim—

1. A fly-trap consisting of a base, $a$, cylinder $d$, door $e$, strips $i$, and gauze $o$, the interior of the cylinder being left unobstructed to facilitate cleaning, substantially as shown.

2. In a fly-trap, a sheet of gauze, $o$, or other transparent material, placed over the opening in the top of the base, and extending upward along the inside of the cylinder, the interior of the cylinder being left unobstructed to facilitate cleaning, substantially as set forth.

In testimony that I claim the foregoing I have hereunto set my hand this 3d day of April, 1877.

JAMES T. GUTHRIE.

Witnesses:
DAVID KINZER,
W. S. KINZER.